(12) United States Patent
Shimomura et al.

(10) Patent No.: US 11,916,469 B2
(45) Date of Patent: Feb. 27, 2024

(54) RESONANT POWER CONVERSION DEVICE

(71) Applicants: Nissan Motor Co., Ltd., Kanagawa (JP); RENAULT S.A.S., Boulogne-Billancourt (FR)

(72) Inventors: Taku Shimomura, Kanagawa (JP); Keiichiro Numakura, Kanagawa (JP); Akinori Okubo, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/251,307

(22) PCT Filed: Nov. 6, 2020

(86) PCT No.: PCT/IB2020/000926
§ 371 (c)(1),
(2) Date: May 1, 2023

(87) PCT Pub. No.: WO2022/096907
PCT Pub. Date: May 12, 2022

(65) Prior Publication Data
US 2023/0412062 A1    Dec. 21, 2023

(51) Int. Cl.
*H02M 1/00* (2006.01)
*H02M 1/08* (2006.01)
*H02M 3/156* (2006.01)
*H02M 3/00* (2006.01)

(52) U.S. Cl.
CPC ........... *H02M 1/0058* (2021.05); *H02M 1/08* (2013.01); *H02M 3/015* (2021.05); *H02M 3/156* (2013.01)

(58) Field of Classification Search
CPC ...... H02M 1/0058; H02M 1/08; H02M 3/015; H02M 3/156
See application file for complete search history.

(56) References Cited

U.S. PATENT DOCUMENTS

2007/0195560 A1*  8/2007  Yasumura ............... G05F 1/70
363/21.01
2009/0251925 A1* 10/2009  Usui ................ H02M 3/33561
363/16

FOREIGN PATENT DOCUMENTS

JP    H06-243985 A    9/1994
JP    2009-017749 A   1/2009
(Continued)

OTHER PUBLICATIONS

Hayati, M et al.; "Analysis and Design of Class-E Power Amplifier With MOSFET Parasitic Linear and Nonlinear Capacitances at Any Duty Ratio"; IEEE Transactions on Power Electronics, vol. 28, No. 11, Nov. 2013, pp. 5222-5232 (11 pages).

*Primary Examiner* — Kyle J Moody
(74) *Attorney, Agent, or Firm* — Osha Bergman Watanabe & Burton LLP

(57) ABSTRACT

A resonant power conversion device includes: a main circuit provided with a semiconductor switch, a capacitor and an inductor connected in series or parallel to the semiconductor switch; and a drive circuit configured to drive the switching element. The switching element enters an off-state or an on-state depending on a control voltage input to a gate terminal, and the drive circuit includes two or more types of control voltages, as a control voltage at which the switching element enters an off-state.

9 Claims, 4 Drawing Sheets

(56) References Cited

FOREIGN PATENT DOCUMENTS

JP       2009-254062 A    10/2009
JP       2015-012624 A    1/2015

\* cited by examiner

RESONANT POWER CONVERSION DEVICE

TECHNICAL FIELD

The present invention relates to a resonant power conversion device.

BACKGROUND ART

Patent Literature 1 discloses a class-E amplifier circuit including a series circuit configured of a resonant coil and a resonant capacitor with a resonant point near the operating frequency. A series circuit configured of a capacitor and a switching element is connected to the class E amplifier circuit in parallel with the resonant capacitor. By switching between opening and short-circuiting of the switching element, it is possible to change a combined capacitance in parallel with the resonant capacitor.

CITATION LIST

Patent Literature

Patent Literature 1: Japanese Unexamined Patent Application Publication No. H6-243985

SUMMARY OF THE INVENTION

Technical Problem

However, the method disclosed in Patent Literature 1 has a problem that circuit components such as a capacitor and a switching element need to be added to a main circuit, which complicates the circuit configuration.

The present invention has been made in view of the above problem, and an object of the present invention is to provide a resonant power conversion device that is capable of reducing switching loss.

Technical Solution

A resonant power conversion device according to an aspect of the present invention includes: a main circuit provided with a switching element, and a capacitor and an inductor connected in series or parallel to the switching element; and a drive circuit configured to drive the switching element. The drive circuit includes two or more types of signal values, as a signal value of a control signal at which the switching element enters an off-state.

Advantageous Effect of the Invention

The present invention makes it possible to reduce switching loss with a simple circuit configuration.

DESCRIPTION OF EMBODIMENTS

Figure 1:
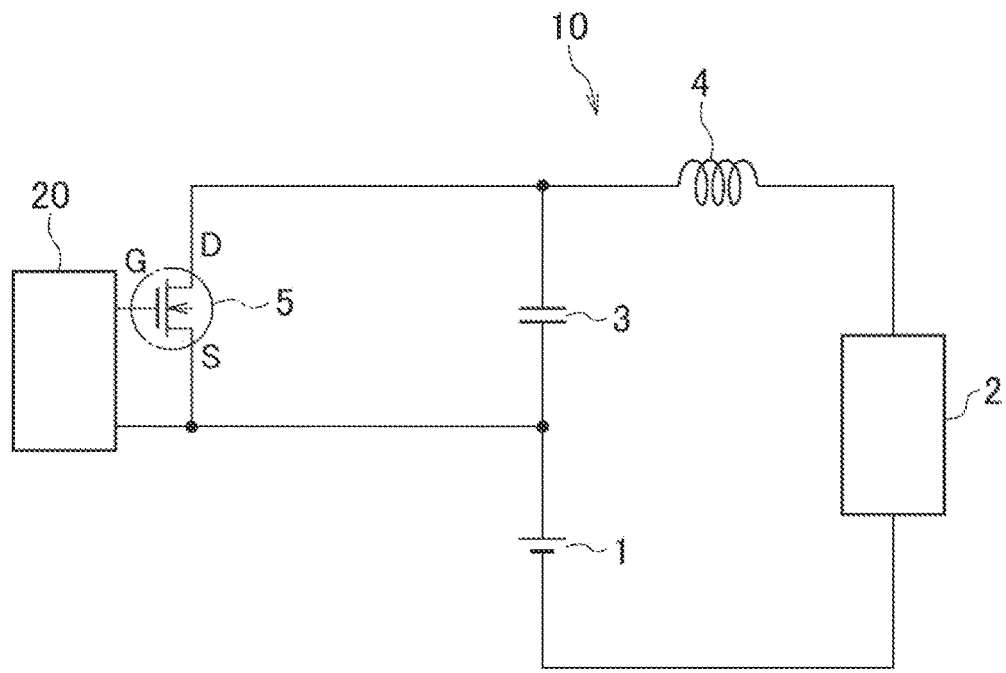
FIG. 1 is a configuration diagram illustrating a resonant power conversion device according to a first embodiment.

Embodiments of the present invention will be described below with reference to the drawings. In the drawings, the same parts are denoted by the same reference numerals and the description thereof is omitted.

First Embodiment

The configuration of a resonant power conversion device according to a present embodiment will be described with reference to FIG. 1. The resonant power conversion device according to the present embodiment includes: a main circuit 10 that converts and outputs input power; and a drive circuit 20 that drives the main circuit 10. A power supply 1 and a load 2 are connected to the main circuit 10. The power supply 1 is, for example, a DC power supply.

The main circuit 10 includes a capacitor 3, an inductor 4, and a semiconductor switch 5. The main circuit 10 is a voltage resonant circuit in which the voltage resonates in the period when the semiconductor switch 5 is in the off-state.

The capacitor 3 and the inductor 4 are connected in series between the power supply 1 and the load 2 in the order from the capacitor 3 to the inductor 4.

The semiconductor switch 5 is a switching element having a high-potential terminal, a low-potential terminal and a control terminal. The semiconductor switch 5 is, for example, a MOSFET, and a drain terminal D, a source terminal S, and a gate terminal G correspond to the high-potential terminal, the low-potential terminal, and the control terminal, respectively.

The drain terminal D of the semiconductor switch 5 is connected to the connection point between the capacitor 3 and the inductor 4. The source terminal S of the semiconductor switch 5 is connected to the power supply 1.

The drive circuit 20 outputs a control signal to the gate terminal G to drive the semiconductor switch 5. The semiconductor switch 5 enters an on-state or an off-state depending on the signal value of a control signal input to the gate terminal G, more specifically, depending on a voltage applied to the gate terminal G (hereinafter referred to as a "control voltage").

When the control voltage exceeds a threshold, the semiconductor switch 5 enters an on-state, that is, the semiconductor switch 5 is switched to ON between the drain terminal D and the source terminal S. When the control voltage is below the threshold, the semiconductor switch 5 enters an off-state, that is, is switched to OFF between the drain terminal D and the source terminal S. Hereafter, the control voltage at which the semiconductor switch 5 enters an on-state is called an "on-control voltage", and the control voltage at which the semiconductor switch 5 enters an off-state is called an "off-control voltage".

In the present embodiment, the drive circuit 20 has two or more types of off-control voltages, that is, two or more types of control voltages at which each voltage is below a threshold. In addition, the drive circuit 20 can change an off-control voltage using two or more types of off-control voltages. As described later, each of the two or more types of off-control voltages is set in accordance with the resonant frequency to be generated in the main circuit 10.

Figure 2:
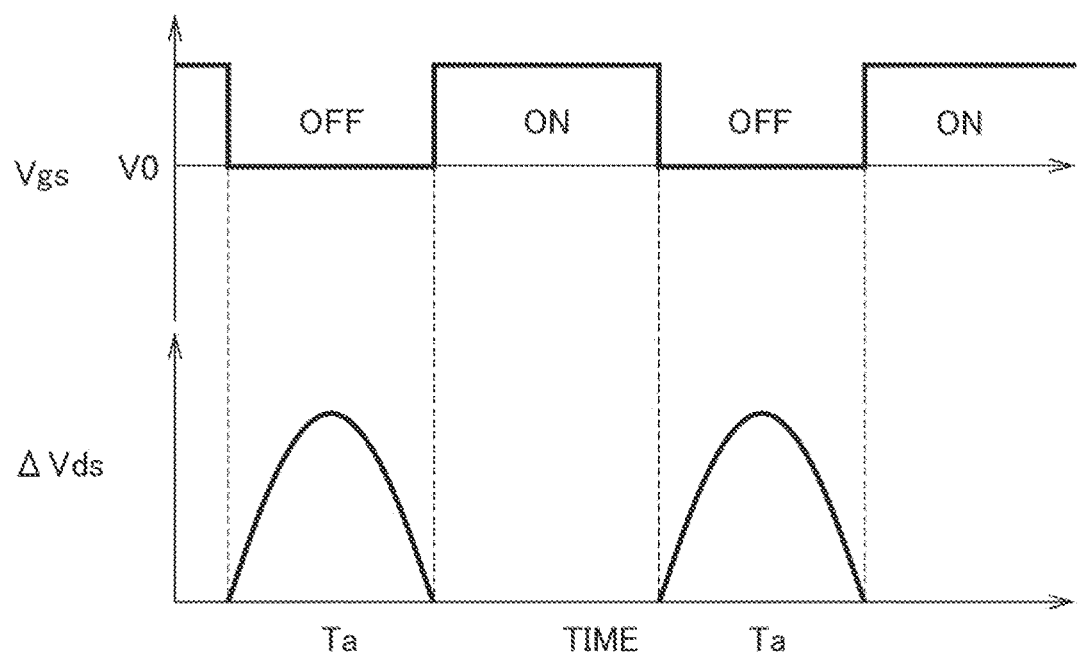
FIG. 2 is a timing chart illustrating a control timing of a semiconductor switch.
Figure 3:
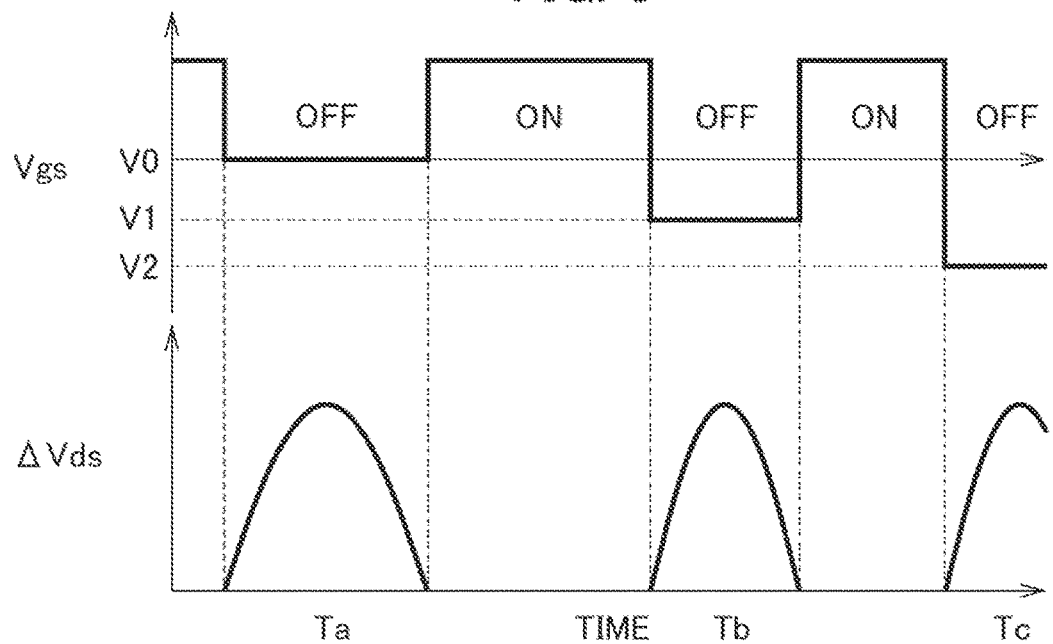
FIG. 3 is a timing chart illustrating a control timing of a semiconductor switch according to the first embodiment.
Figure 4:
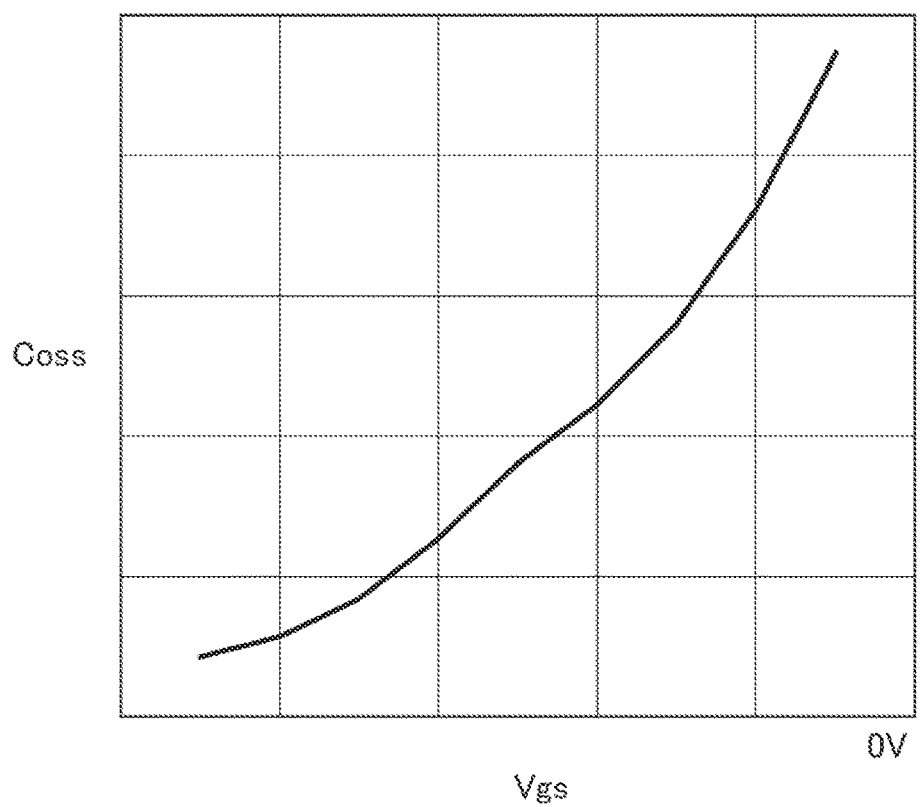
FIG. 4 is a diagram illustrating a relationship between a control voltage and an output capacitance of the semiconductor switch.

A control method of the semiconductor switch 5 performed by the drive circuit 20 will be described below with reference to FIG. 2 to FIG. 4. FIG. 2 and FIG. 3 illustrate the amount of voltage change in the drain-source voltage ΔVds with respect to the control voltage Vgs that is applied to the gate terminal G. FIG. 4 illustrates the change of the output capacitance Coss in the semiconductor switch 5 with respect to the control voltage Vgs.

First, a general soft switching concept will be described. As illustrated in FIG. 2, the drive circuit 20 alternately switches the semiconductor switch 5 between an on-state and an off-state. In the main circuit 10 which is a voltage resonant circuit, the drain-source voltage ΔVds vibrates when the semiconductor switch 5 is in the off-state, and a resonant waveform is generated in the amount of voltage change in the drain-source voltage ΔVds.

The resonant waveform is generated by the capacitor 3, the inductor 4, and the output capacitance Coss in the semiconductor switch 5, and the period thereof relates to the resonant frequency of the main circuit 10 which depends on the capacitor 3, the inductor 4, and the output capacitance Coss in the semiconductor switch 5. When the capacitor 3, the inductor 4, and the output capacitance Coss in the semiconductor switch 5 have the same conditions, the resonant frequency is also constant, and thus the amount of voltage change in the drain-source voltage ΔVds is also a resonant waveform with a constant period Ta.

Accordingly, the drive circuit 20 applies an on-control voltage or an off-control voltage to the gate terminal G at a switching frequency that is based on the resonant frequency of the main circuit 10, which enables soft switching or low-loss switching to be performed. FIG. 2 illustrates a half-wave resonance; however, a full-wave resonance is also acceptable.

Incidentally, when there is a change in a switching timing according to a change such as the output of the main circuit 10, a deviation occurs between the switching frequency and the resonance frequency. For this reason, it may not be possible to perform soft switching or low-loss switching. In the present embodiment, it is possible to realize soft switching or low-loss switching by changing the resonance frequency of the main circuit 10 according to the required switching frequency.

The drive circuit 20 is assumed to have three types of off-control voltages, and FIG. 3 illustrates three types of off-control voltages V0, V1, and V2. The off-control voltages V0, V1, and V2 are voltage values below the threshold of the semiconductor switch 5, and V1 has a lower voltage than V0, and V2 has a lower voltage than V1. The off-control voltage V0 is applied to the first off-period illustrated in FIG. 3, and the off-control voltage V1 is applied to the second off-period coming after the on-period, after the first off-period. Similarly, the off-control voltage V2 is applied to the third off-period coming after the on-period, after the second off-period.

Here, as illustrated in FIG. 4, there is a relationship between the control voltage Vgs and the output capacitance Coss such that the output capacitance Coss decreases as the control voltage Vgs decreases. Accordingly, the output capacitance Coss decreases by lowering the off-control voltage that is applied from the drive circuit 20 to the gate terminal G.

For this reason, as illustrated in FIG. 3, the periods Ta, Tb, and Tc of the resonance waveform become shorter by lowering the off-control voltages V0, V1, and V2. That is, the resonance frequency generated in the main circuit 10 becomes greater. In view of such a relationship, the off-control voltages V0, V1, and V2 of the drive circuit 20 are set based on the resonance frequency to be generated in the main circuit 10.

It is possible to realize soft switching or low-loss switching by changing the switching period according to the periods Ta, Tb, and Tc of the resonance waveform corresponding to the off-control voltages V0, V1, and V2. For example, in a case in which the output of the main circuit 10 increases, the switching period needs to increase in the next coming off-period in comparison with the preceding off-period. For this reason, the off-control voltage in the next coming off-period is made greater than the off-control voltage in the preceding off-period. This makes it possible to perform soft switching or low-loss switching, and change the switching period according to the output change of the main circuit 10.

As described above, according to the present embodiment, the drive circuit 20 has two or more types of off-control voltages. When an off-control voltage is applied to the gate terminal G, the output capacitance Coss of the semiconductor switch 5 differs depending on a voltage value of the off-control voltage (type of off-control voltage). Accordingly, the output capacitance Coss of the semiconductor switch 5 behaves like a variable capacitance according to the type of off-control voltage output by the drive circuit 20. Thus, the resonant frequency generated in the main circuit 10 can be freely controlled. Switching loss can be reduced by harmonizing the resonant frequency generated in the main circuit 10 with the switching frequency. In addition, it is not necessary to add a circuit component to the main circuit 10 because only two or more types of off-control voltages need to be utilized. This makes it possible to reduce switching loss with a simple circuit configuration.

In addition, each of two or more types of off-control voltages in the drive circuit 20 is set in accordance with the resonance frequency to be generated in the main circuit 10. This configuration makes it possible to optionally control the resonance frequency generated in the main circuit 10 according to two or more types of off-control voltages. The number of situations in which soft switching can be performed increases by harmonizing the resonance frequency generated in the main circuit 10 with the switching frequency, and thus switching loss can be reduced.

In addition, the drive circuit 20 can change the off-control voltage using two or more types of off-control voltages. According to this configuration, when the drive circuit 20 changes the off-control voltage, the output capacitance Coss of the semiconductor switch 5 behaves like a variable capacitance, and thus the resonant frequency generated in the main circuit 10 can be controlled. The number of situations in which soft switching can be performed increases by harmonizing the resonance frequency generated in the main circuit 10 with the switching frequency, and thus switching loss can be reduced.

In addition, when changing to the next off-period coming after the on-period, after the preceding off-period, the drive circuit 20 can change the off-control voltage in the preceding off-period to the off-control voltage in the next off-period. This configuration makes it possible to change the off-control voltage applied to the gate terminal G for each off-period, and thus it is possible to increase the number of times that the resonant frequency is optimized. For this reason, switching loss can be reduced.

In this case, the drive circuit 20 can change the off-control voltage in the next off-period on the basis of the output of the main circuit 10. It is possible to harmonize the resonant frequency generated in the main circuit 10 with the switching frequency corresponding to the output of the main circuit 10. This increases the number of situations in which soft switching can be performed, and thus switching loss can be reduced.

Specifically, when the output of the main circuit 10 increases, the drive circuit 20 makes the off-control voltage in the next coming off-period greater than the off-control voltage in the preceding off-period. This configuration makes it possible to associate a change in the switching frequency corresponding to an increase in the output of the main circuit 10, with a change in the resonant frequency of the main circuit 10. Thus, switching loss can be reduced.

In the present embodiment, a description has been given regarding the drive circuit 20 that changes the off-control voltage on the basis of the output of the main circuit 10. However, the drive circuit 20 may change the off-control voltage on the basis of the input of the main circuit 10. In addition, the resonance frequency of the main circuit 10 changes according to changes in the voltage, current, and temperature of the semiconductor switch 5, the capacitor 3, and the inductor 4. Accordingly, the drive circuit 20 may change the off-control voltage on the basis of the voltage, current, and temperature of the semiconductor switch 5, the capacitor 3, and the inductor 4. Thus, switching loss can be reduced regardless of input-output fluctuations or environmental fluctuations of the main circuit 10.

Second Embodiment

A resonant power conversion device according to a second embodiment will be described below. The resonant power conversion device according to the second embodiment differs in the control method of an off-control voltage from the resonant power conversion device according to the first embodiment. Descriptions that are the same as those of the first embodiment are omitted, and differences therefrom will be mainly described below.

Figure 5:
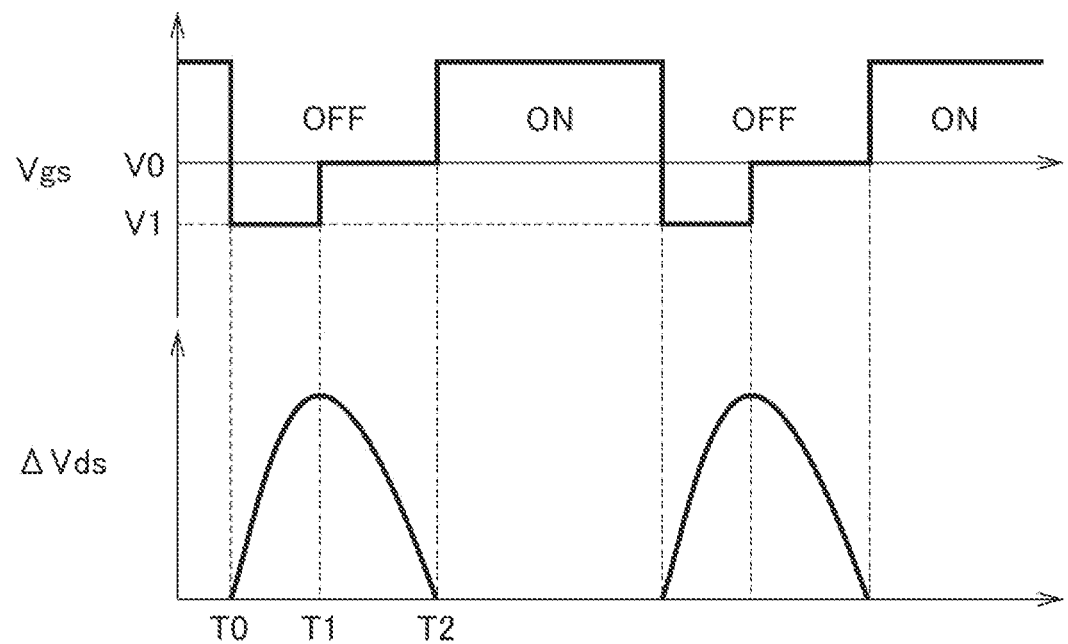
FIG. 5 is a timing chart illustrating a control timing of a semiconductor switch according to a second embodiment.

The drive circuit 20 of the first embodiment described above controls an off-control voltage to be kept constant regardless of the transition of time as long as the off-control voltage is within one off-period. In contrast, as illustrated in FIG. 5, the drive circuit 20 of the first embodiment switches between two types of off-control voltages V0 and V1 within one off-period. Specifically, the drive circuit 20 outputs an off-control voltage V1 in the first period from timing T0 when the off-period begins until timing T1, and outputs an off-control voltage V0 in the second period from timing T1 until timing T2 when the off-period ends.

In this case, the resonant waveform of the drain-source voltage ΔVds illustrates a response corresponding to the off-control voltage V1 in the first period from timing T0 to timing T1, and a response corresponding to the off-control voltage V0 in the second period from timing T1 to timing T2. Since a resonant waveform with a short period occurs in the first period corresponding to the off-control voltage V1, the period of the resonant waveform is shorter than when the off-control voltage V0 is uniformly applied throughout the off-period.

Thus, it is possible to increase the resonance frequency generated in the main circuit 10 by setting the first period of the off-control voltage V1, and the second period of the off-control voltage V0 that is greater than the off-control voltage V1, within one off-period.

Further, the period of the resonance waveform differs by changing the ratio between the first period and the second period. Specifically, when a ratio of the first period increases, the period of the resonance waveform becomes relatively shorter. This makes it possible to increase the resonance frequency generated in the main circuit 10.

The off-control voltage to be applied in the first period is not limited to the off-control voltage V1, and may be a voltage value as long as it is lower than the off-control voltage V0. At this time, the period of the resonant waveform becomes relatively shorter as the off-control voltage to be applied in the first period is lower than the off-control voltage to be applied in the second period. This makes it possible to increase the resonance frequency generated in the main circuit 10.

As described above, according to the present embodiment, the drive circuit 20 can change an off-control voltage within one off-period, and thus the resonant frequency generated in the main circuit 10 can be optionally controlled. Thus, it is possible to harmonize the resonant frequency generated in the main circuit 10 with the switching frequency. As a result, the number of situations in which soft switching can be performed increases, and thus switching loss can be reduced.

In addition, the drive circuit 20 can change the ratio between the first period and the second period, or change the voltage ratio between the off-control voltage applied in the first period and the off-control voltage applied in the second period. Thus, the resonant frequency generated in the main circuit 10 can be flexibly controlled.

At this time, as in the first embodiment, the drive circuit 20 can change the ratio between the first period and second period or the voltage ratio therebetween, based on the input and output of the main circuit 10 and based on one or more values among the voltage, current, and temperature of the semiconductor switch 5, the capacitor 3, and the inductor 4. Thus, switching loss can be reduced regardless of input and output fluctuations or environmental fluctuations of the main circuit 10.

The drive circuit 20 performs switching in one off-period using two types of off-control voltages. However, the drive circuit 20 may perform switching using three or more types of off-control voltages.

Further, in the present embodiment, the drive circuit 20 switches from a low off-control voltage to a high off-control voltage when switching from the first period to the second period. Thus, the voltage at the end of the off-period becomes a high off-control voltage. For this reason, since the deviation from an on-control voltage is small, the transition to an on-period can be performed smoothly. However, the drive circuit 20 may switch from a high off-control voltage to a low off-control voltage when switching from the first period to the second period.

Further, in the above-described embodiment, the drive circuit 20 changes an off-control voltage in a stepwise manner. However, the switching method of an off-control voltage within one off-period is not limited to this stepwise method.

Figure 6:
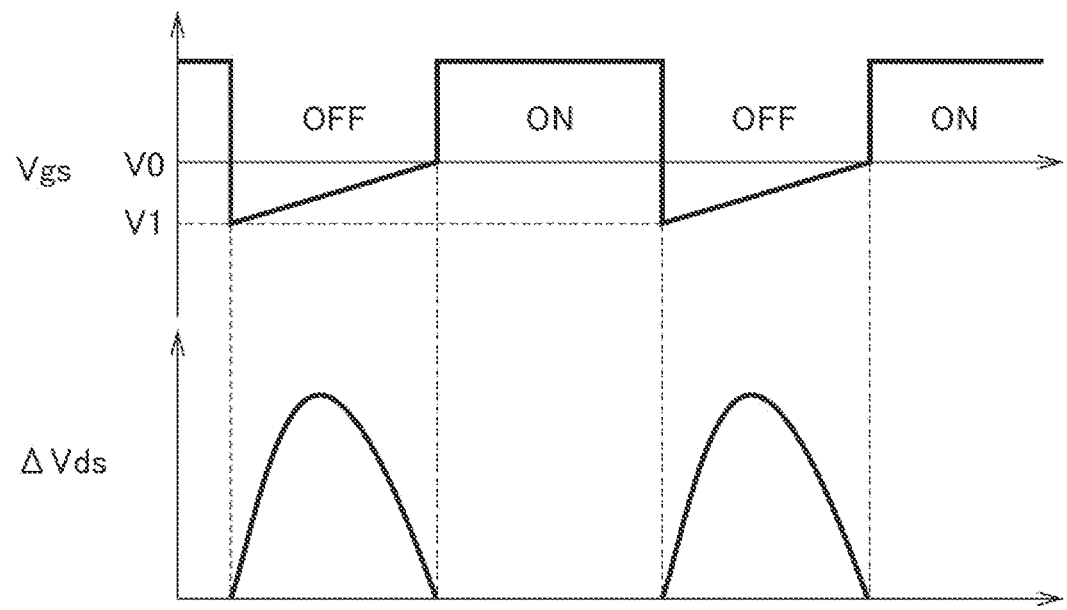
FIG. 6 is a timing chart illustrating the control timing of the semiconductor switch according to the second embodiment.

As illustrated in FIG. 6, the drive circuit 20 may continuously change an off-control voltage in accordance with the transition of time within one off-period. In the example illustrated in FIG. 6, the off-control voltage becomes V1 at the beginning of the off-period, continuously rises in accordance with the transition of time, and becomes V0 at the beginning of the off-period. In this configuration, the period of the resonant waveform becomes relatively shorter than when the off-control voltage V0 is uniformly applied throughout the off-period. This makes it possible to appropriately control the resonant frequency generated in the main circuit 10.

In this case, the drive circuit 20 can change the slope of an off-control voltage by changing one or both of an off-control voltage at the beginning of the off-period and an off-control voltage at the end of the off-period. This makes it possible to appropriately control the resonant frequency generated in the main circuit 10.

In the example illustrated in FIG. 6, the drive circuit 20 changes an off-control voltage linearly from the beginning to the end of the off-period, but the drive circuit 20 is limited thereto. The drive circuit 20 may change an off-control voltage non-linearly.

In the first and second embodiments described above, FIG. 1 illustrates the configuration of the main circuit 10. However, the main circuit 10 is not limited to a voltage resonant circuit, and may be a current resonant circuit in which the current resonates in the period when the semiconductor switch 5 is in the on-state.

Figure 7:
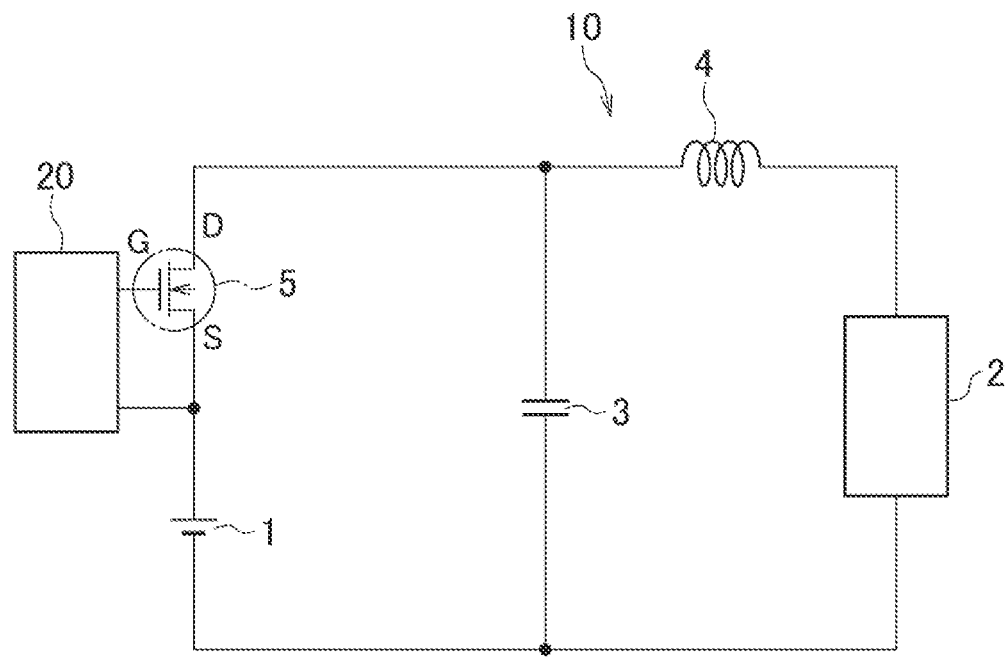
FIG. 7 is a diagram illustrating a modification of a resonant power conversion device.
Figure 8:
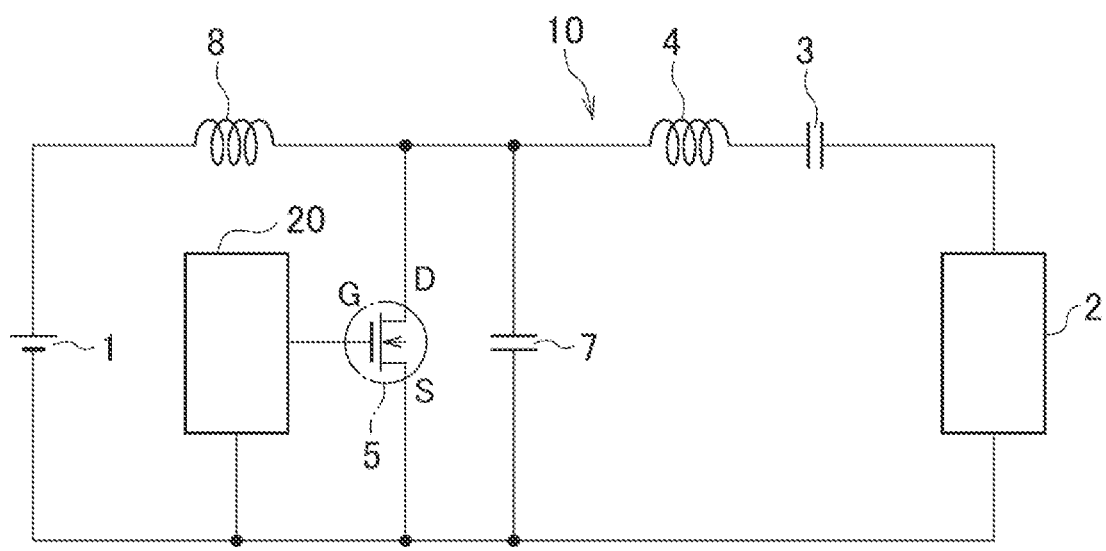
FIG. 8 is a diagram illustrating a modification of a resonant power conversion device.

For example, as illustrated in FIG. 7, the main circuit 10 may form a resonant circuit by connecting the capacitor 3 in parallel to the power supply 1. For example, as illustrated in FIG. 8, the main circuit 10 further includes a capacitor 7 and an inductor 8, and functions as a class-E amplifier circuit. In this main circuit 10, the inductor 8 has a function of keeping the current constant, and the capacitor 7 is provided such that the current flows to the load 2 in the time domain in which the semiconductor switch 5 enters an off-state.

Further, in the present embodiment, a MOSFET is illustrated as an example of the semiconductor switch 5. However, a switching element of the main circuit 10 other than a unipolar type, a bipolar type, or a bandgap of an element material may be used.

For example, a semiconductor switch may enter an off-state or an on-state depending on the signal value of a control signal input to a control terminal, more specifically, the current supplied to a control terminal (hereinafter referred to as a "control current"). Accordingly, a semiconductor switch enters an on-state when the control current exceeds a threshold. In contrast, a semiconductor switch enters an off-state when the control current is below a threshold. Hereafter, the control current at which the semiconductor switch 5 enters an on-state is called an "on-control current", and the control current at which the semiconductor switch 5 enters an off-state is called an "off-control current".

In this case, the drive circuit 20 has two or more types of off-control currents, that is, two or more types of control currents at which each current is below a threshold. In this case, the drive circuit 20 can optionally change two or more types of off-control currents, and each of two or more types of off-control current is set based on the resonant frequency to be generated in the main circuit 10, as in the above-described embodiment.

The embodiments of the present invention have been described above, but the statements and drawings forming part of this disclosure should not be understood as limiting the invention. Various alternative embodiments, examples, and operating techniques will be apparent to those skilled in the art from this disclosure.

LIST OF REFERENCE NUMERALS

1: Power supply
2: Load
10: Main circuit
3: Capacitor
4: Inductor
5: Semiconductor switch
20: Drive circuit
G: Gate terminal (control terminal)
D: Drain terminal (high-potential terminal)
S: Source terminal (low-potential terminal)

The invention claimed is:

1. A resonant power conversion device comprising:
   a main circuit provided with a switching element having a high-potential terminal, a low-potential terminal and a control terminal, and provided with a capacitor and an inductor connected in series or parallel to the high potential terminal or the low potential terminal, and the main circuit being configured to convert and output input power; and
   a drive circuit configured to output a control signal to the control terminal and drive the switching element, wherein
   the switching element enters an off-state or an on-state depending on a signal value of the control signal input to the control terminal,
   the drive circuit includes two or more types of signal values, as the signal value of the control signal at which the switching element enters an off-state, and
   each of the two or more types of signal values is set in accordance with a resonant frequency to be generated in the main circuit.

2. The resonant power conversion device according to claim 1, wherein
   the drive circuit changes the signal value of the control signal at which the switching element enters an off-state, using the two or more types of signal values.

3. The resonant power conversion device according to claim 2, wherein
   the drive circuit, when changing the switching element to a second off-period coming after an on-period after a first off-period, changes a signal value of the control signal in the second off-period from a signal value of the control signal in the first off-period.

4. The resonant power conversion device according to claim 3, wherein
   the drive circuit changes the signal value of the control signal in the second off-period from the signal value of the control signal in the first off-period, based on input and output of the main circuit and based on one or more values among a voltage, current, and temperature of the semiconductor switch, the capacitor, and the inductor.

5. The resonant power conversion device according to claim 4, wherein
   the drive circuit, when output of the main circuit increases, makes the signal value of the control signal in the second off-period greater than the signal value of the control signal in the first off-period.

6. The resonant power conversion device according to claim 2, wherein
   the drive circuit changes the signal value of the control signal in one off-period, one or more times, and in the off-period, sets a first period in which the signal value of the control signal is low and a second period in which the signal value of the control signal is greater than that of the first period.

7. The resonant power conversion device according to claim 6, wherein
   the drive circuit changes one or both of a ratio between the first period and the second period in the off-period and a ratio of the signal value of the control signal in the first period and the signal value of the control signal in the second period, based on input and output of the main circuit and based on one or more values among a voltage, current, and temperature of the semiconductor switch, the capacitor, and the inductor.

8. The resonant power conversion device according to claim 6, wherein
the drive circuit sets the first period and the second period in the off-period, in order from the first period to the second period.

9. The resonant power conversion device according to claim 2, wherein
the drive circuit continuously changes the signal value of the control signal in accordance with a transition of time in one off period.

* * * * *